United States Patent [19]
Kelley

[11] Patent Number: 6,164,008
[45] Date of Patent: Dec. 26, 2000

[54] LIVE ANIMAL AND FOWL TRAP WITH TRANSFER CAPABILITY

[76] Inventor: A. J. Kelley, 100 SE. Gamble St., Burleson, Tex. 76028

[21] Appl. No.: 09/366,292

[22] Filed: Aug. 2, 1999

[51] Int. Cl.[7] .............................. A01M 23/02; A01K 1/03
[52] U.S. Cl. ................................................. 43/61; 119/452
[58] Field of Search ...................... 43/58, 60, 61, 43/67; 119/452, 453, 459, 461, 463, 472, 474, 491, 498, 502, 507, 512, 513; 140/58; 206/389; 256/32, 47, 73, 35, 54, 56, DIG. 3

[56] References Cited

U.S. PATENT DOCUMENTS

| | | | |
|---|---|---|---|
| 305,664 | 9/1884 | Bryan | 43/61 |
| 1,382,416 | 6/1921 | Dresser | 43/61 |
| 1,524,692 | 2/1925 | Dick | 43/61 |
| 2,087,646 | 7/1937 | Houghton | 43/61 |
| 2,488,202 | 11/1949 | Kern | 43/61 |
| 2,524,504 | 10/1950 | Woolworth | 43/61 |
| 2,611,989 | 9/1952 | Larson | 43/61 |
| 2,725,661 | 12/1955 | Bowman | 43/61 |
| 3,113,395 | 12/1963 | Van Kuren | 43/61 |
| 3,426,470 | 2/1969 | Rudolph . | |
| 3,483,652 | 12/1969 | Hanlan | 43/61 |
| 3,834,063 | 9/1974 | Souza . | |
| 4,159,590 | 7/1979 | Palfalvy | 43/61 |
| 4,162,588 | 7/1979 | Wyant | 43/61 |
| 4,187,634 | 2/1980 | Kintz | 43/61 |
| 4,546,568 | 10/1985 | Seyler | 43/61 |
| 5,199,210 | 4/1993 | Nastas . | |
| 5,778,594 | 7/1998 | Askin et al. . | |
| 5,791,292 | 8/1998 | Jempolsky . | |
| 5,845,432 | 12/1998 | Tully et al. | 43/61 |

OTHER PUBLICATIONS

Pied Piper Animal Trapes Note: No Patent information noted.

*Primary Examiner*—Peter M. Poon
*Assistant Examiner*—Fredrick T. French, III

[57] ABSTRACT

A sturdy lightweight enclosure that will capture alive animals and fowl is disclosed herein. The application of a downwardly directed pressure on a trip pad on an interior portion of the trap by an animal causes the trap mechanism to release the door which falls under gravity and encloses the animal or fowl in the enclosure. The invention is characterized by having a bell crank wheel which rotatively translates a vertically downwardly directed force into a horizontally directed force which allows the trap to close. The trap is additionally provided with adjustable sensitivity to allow only animals having a desired weight to spring the trap. The sensitivity is adjusted through a plurality of holes in a rod which allows selective compression of an actuating spring. The greater initial compression on the spring the larger the animal must be to spring the trap.

2 Claims, 4 Drawing Sheets

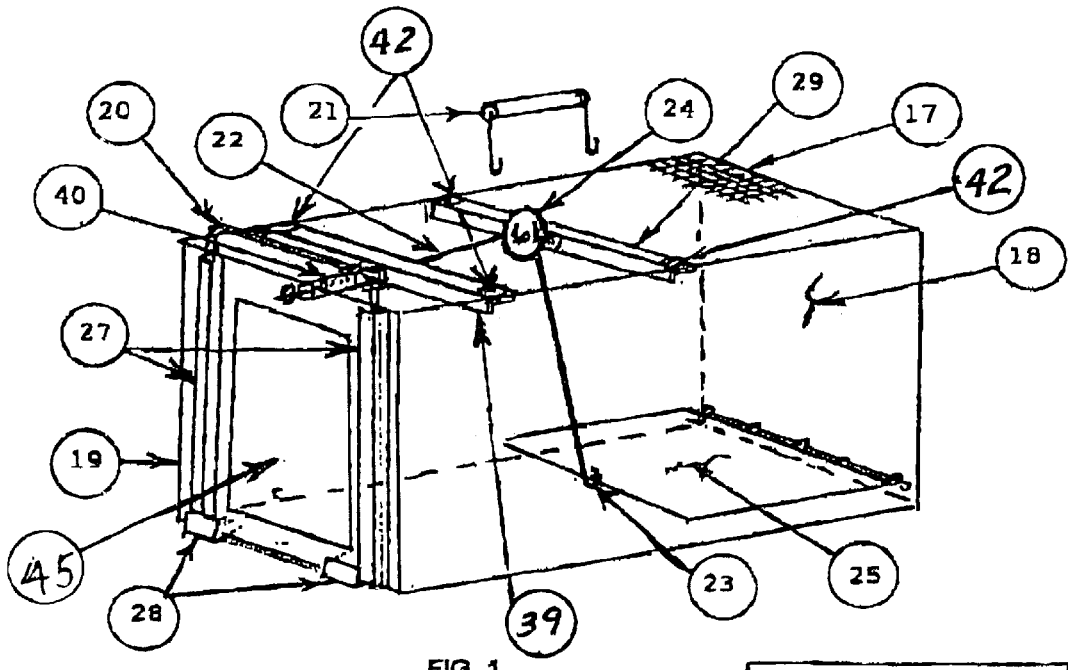
FIG. 1
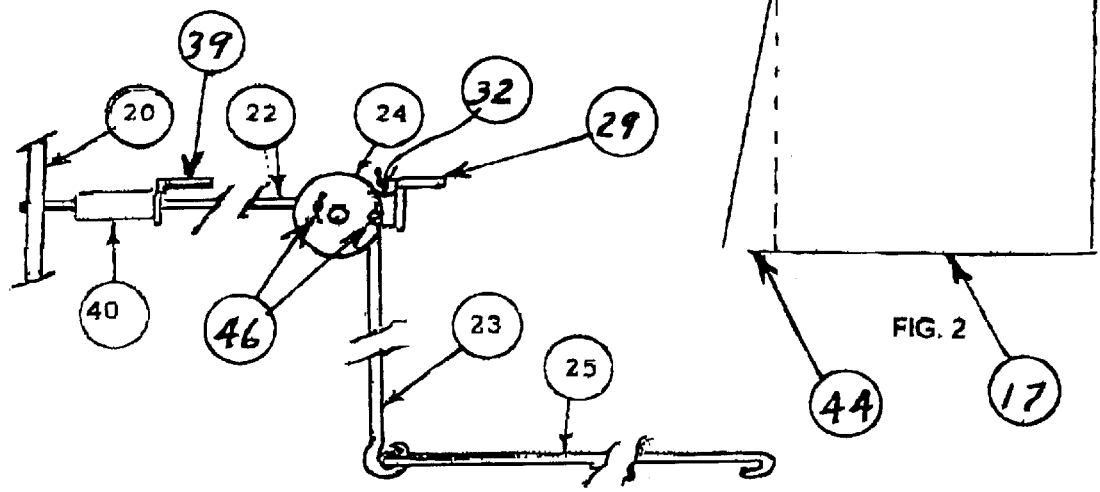
FIG. 3A
FIG. 2

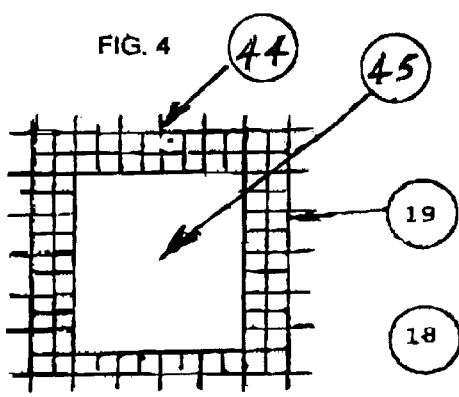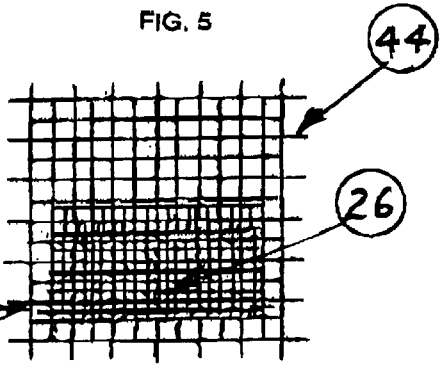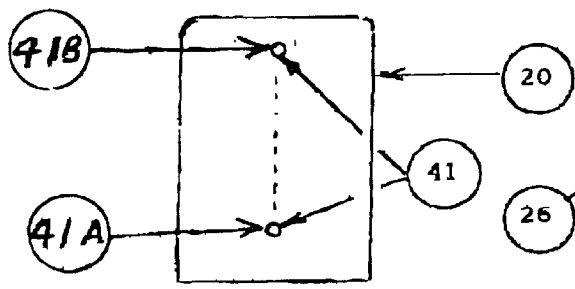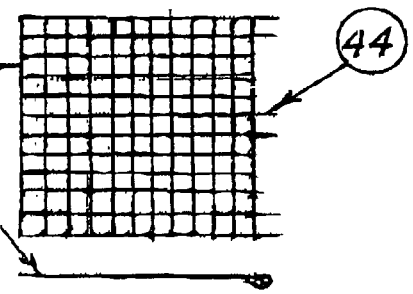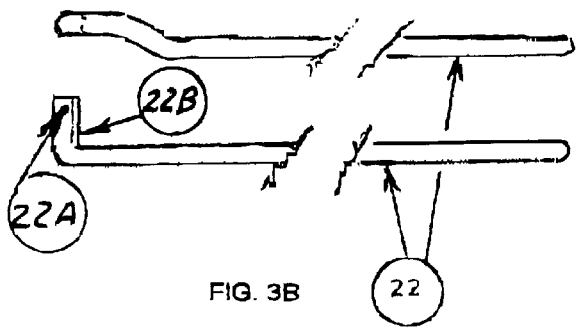

LIVE ANIMAL AND FOWL TRAP WITH TRANSFER CAPABILITY

BACKGROUND OF THE INVENTION

The animal trap of the present invention provides capture and relocation of small animals and birds. During field testing the trap demonstrated effectiveness for capture and relocation of squirrels, doves, blue jays and crows.

SUMMARY OF THE INVENTION

Bait, such as small nuts and grain, is placed in a small shallow container on the back end of a trip pad. The animals and fowl enter the trap through a front entrance, and upon providing a downwardly directed force to the trip pad in an effort to get the bait, the trap is deployed and the animals or fowl are captured and restrained unharmed within the trap. The trap being lightweight provides for ease of transport of the trap to a location for release or disposal of the captured animals or fowl.

The trap can alternatively be built large to enable the capture of larger animals such as dogs, raccoons and bobcats. Larger versions of the trap are fabricated through the use of similar materials and hardware which increase the size and strength capability of the trap.

The trap is provided with an adjustable sensitivity trigger mechanism which is capable of use with variously sized traps and variously sized animals within a single trap embodiment. The trigger mechanism allows the amount of force required to spring the trap to be varied to enable animal or fowl specification for trapping.

The trap described herein is capable of performing in all weather situations since the trigger mechanism is provided with shielding to cover and protect a spring mechanism which provides the trigger action.

Therefore, it is an object of this invention to provide an animal and fowl trap having an adjustable sensitivity trigger mechanism that is lightweight and capable of use in all weather situations.

It is an object of the invention that the trap requires no frame or superstructure but maintains its shape through the rigidity of the steel cage wire which forms the enclosure, front end and back end. The weight of the trap is substantially reduced since no additional frame or superstructure is required.

It is an additional object of this invention to provide an animal and fowl trap which captures the animals and fowl unharmed and provides for easy relocation of the trap for removal or disposal of the captured animal or fowl therein.

Additional features and advantages of the invention will be apparent from the ensuing description and claims read in conjunction with the attached drawing figures.

BRIEF DESCRIPTION OF THE DRAWINGS

The following briefly described drawings show a preferred embodiment of the trap and the components making up the trap.

FIG. 1 shows a preferred assembled embodiment of the trap of this invention.

FIG. 2 shows an end view of a center section of the trap showing the center section being folded to form the enclosure of the center section.

FIG. 3A shows the linkage assembly providing connection between the door of the trap and the trip pad.

FIG. 3B shows a side view and a top view of the set and lock rod of the trap of the invention.

FIG. 3C shows a top and side view of the trip pad of the trap of the invention.

FIG. 4 shows a view of the front end of the trap prior to installation and showing an overhang of crimp wires extending from the sides thereof FIG. 5 shows a view of the back end of the trap having a bait guard attached thereto and showing an overhang of crimp wires extending from the sides thereof.

FIG. 6 shows a view of the door of the trap from the front showing the location of holes used to lock the door open and closed by insertion of the set and lock rod.

FIG. 7 shows the bait guard prior to installation to the back end of the trap and showing an overhang of crimp wires extending from the sides thereof

Figure 8:
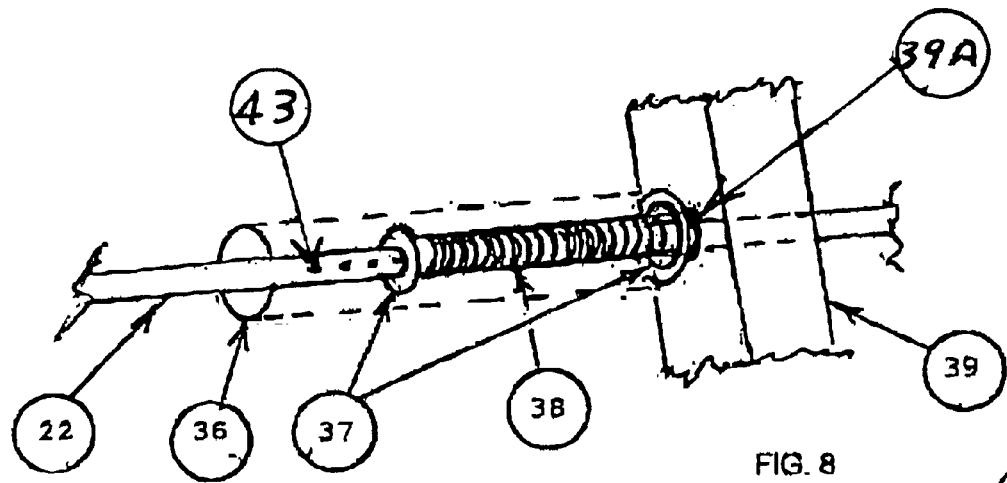
FIG. 8 shows the action control assembly which allows the deployment of the set and lock rod of the trap of the invention.

The following are the reference numerals used throughout the drawing figures and the specification and what they represent:

| | |
|---|---|
| 17 | center section enclosure; |
| 18 | back end; |
| 19 | front end; |
| 20 | door; |
| 21 | carrying handle; |
| 22 | set and lock rod; |
| 22A | aperture in set and lock rod; |
| 22B | bent portion of set and lock rod; |
| 23 | trip link; |
| 23A | aperture in trip link; |
| 23B | bent portion of trip link; |
| 24 | bell crank wheel; |
| 24A | trip link aperture in bell crank wheel; |
| 24B | set and lock rod aperture in bell crank wheel; |
| 24C | bell crank mounting aperture; |
| 25 | trip pad; |
| 26 | bait guard; |
| 27 | door guide; |
| 27A | door guide track; |
| 28 | door stop; |
| 29 | support bracket; |
| 30 | hex fiber locknut; |
| 31 | spacer; |
| 32 | mounting bracket; |
| 33 | shoulder bolt; |
| 34 | hex bolt; |
| 35 | hex nut; |
| 36 | spring guard; |
| 37 | flat washer; |
| 38 | compression spring; |
| 39 | forward support bracket; |
| 39A | aperture in forward support bracket; |
| 40 | action control assembly; |
| 41 | holes in door; |

-continued

| | |
|---|---|
| 41A | lower hole in door; |
| 41B | upper hole in door; |
| 42 | fender washer; |
| 43 | adjustment holes in set and lock rod; |
| 44 | overhanging wire portions; |
| 45 | door front opening; |
| 46 | cotter pin. |

DETAILED DESCRIPTION OF THE INVENTION

The center enclosure section 17, the back end 18 and the front end 19 of the trap are preferably made from 14 gauge, one inch square plated steel cage wire which forms the body of the trap (FIG. 1). Overhanging wire portions 44 (FIG. 2) extend from the peripheral edges of the enclosure 17, back end 18 (FIG. 5) and front end 19 (FIG. 4) to provide crimp wire sections to provide means for joining the enclosure 17, back end 18 and front end 19 to form the body of the trap (shown in FIGS. 4 and 5 for the back end 18 and the front end 19).

Figure 9:
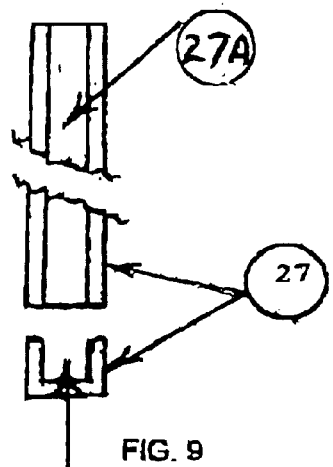
FIG. 9 shows a side view and a cross section view of a door guide of the trap of the invention.

The trap is provided with a door 20 which is provided for closing the door front opening 45, through linkage to be described below, thus capturing animals or fowl which have activated the trap by tripping the trip pad 25. The door 20 is preferably made from a 3/16 inch thick polycarbonate sheet, but any weatherproof material of equal thickness and weight may alternatively be used. Preferably, 5/16 inch holes 41 are drilled through an upper and lower portion of the door 20 (as shown in FIG. 6) which permits entry of the set and lock rod 22 to lock the door 20 in the closed (trap deployed, FIG. 1) and open (trap set) positions, respectively. The door 20 is provided with door guides 27 which engage the door 20 along opposing side edges. The door guides 27 are attached to forward corners of the front end 19 (FIG. 1). The door guides 27 hold the door 20 in place and guide the door 20 for up and down movement. The door guides 27 are preferably made of a U shaped aluminum extrusion (FIG. 9). The door guides 27 are preferably fastened to the forward end 19 of the trap through use of #6 hex head sheet metal screws, wherein the exposed screw tips are removed from the inside of the door guide track 27A after installation to the front end 19 of the trap. The door 20 is further provided with at least two door stops 28 which are used to stop and hold the door in place when in a closed position and when the trap is moved from one place to another. The door stops 28 are preferably made from aluminum right angle stock having dimensions of 1½ inch×1½ inch 1/16 inch. The door stops 28 are preferably mounted to the bottom of the trap under the door guides through the use of the above recited hex bolts, hex nuts and washers (FIG. 1).

The back end 18 of the trap is provided with a bait guard 26 as shown in FIGS. 5 and 7 which prevents and discourages animals from disturbing the bait from outside of the back end 18 of the trap. The bait guard 26 is installed in a double staggered manner to reduce the size of the openings in the back end 18 of the trap. The bait guard 26 has overhanging wire portion 44 as disclosed above for attachment to the back end 18 through the crimp method also used for forming the enclosure of the trap.

Figure 3D:
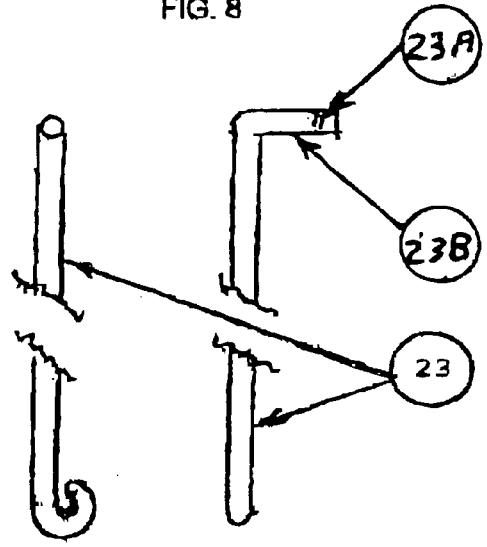
FIG. 3D shows a side and top view of the trip link of the trap of the invention.
Figure 10:
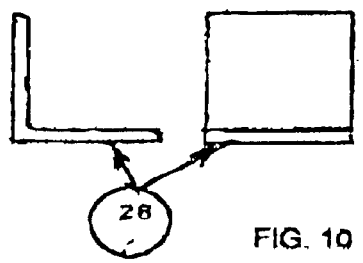
FIG. 10 shows a side view and a cross section view of a door stop of the trap of the invention.
Figure 3E:
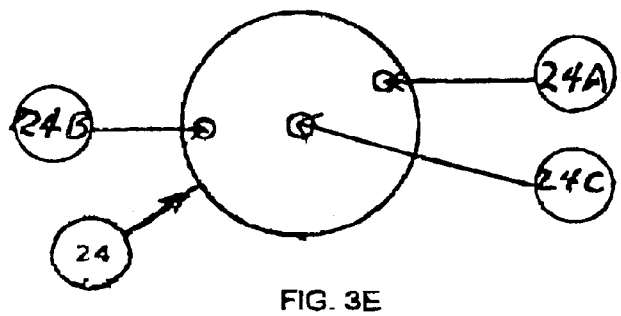
FIG. 3E shows a side view of the bell crack of the trap of the invention.
Figure 11:
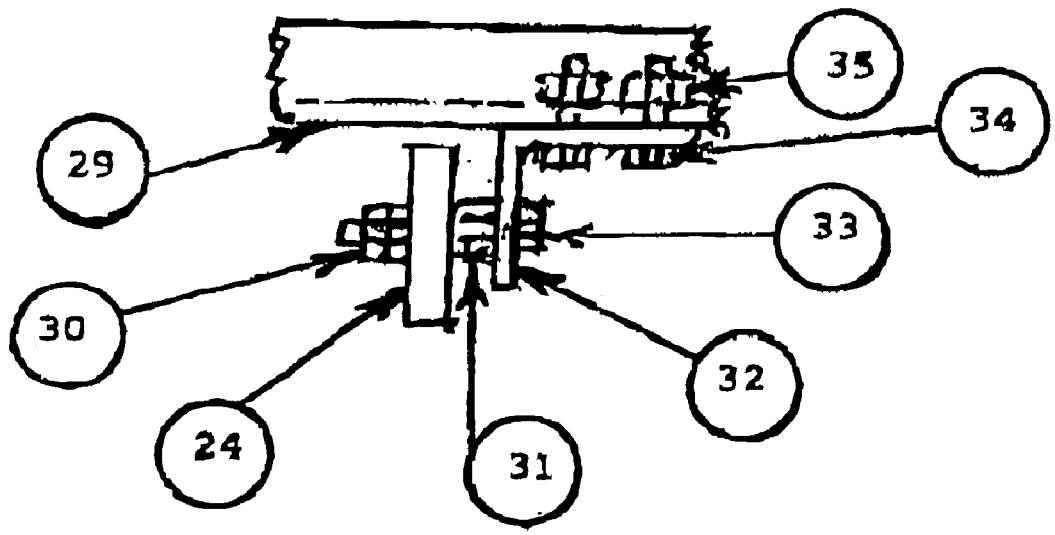
FIG. 11 shows an edge view of the bell crank wheel assembly including mounting bracket in the installed configuration to the support bracket.
Figure 12:
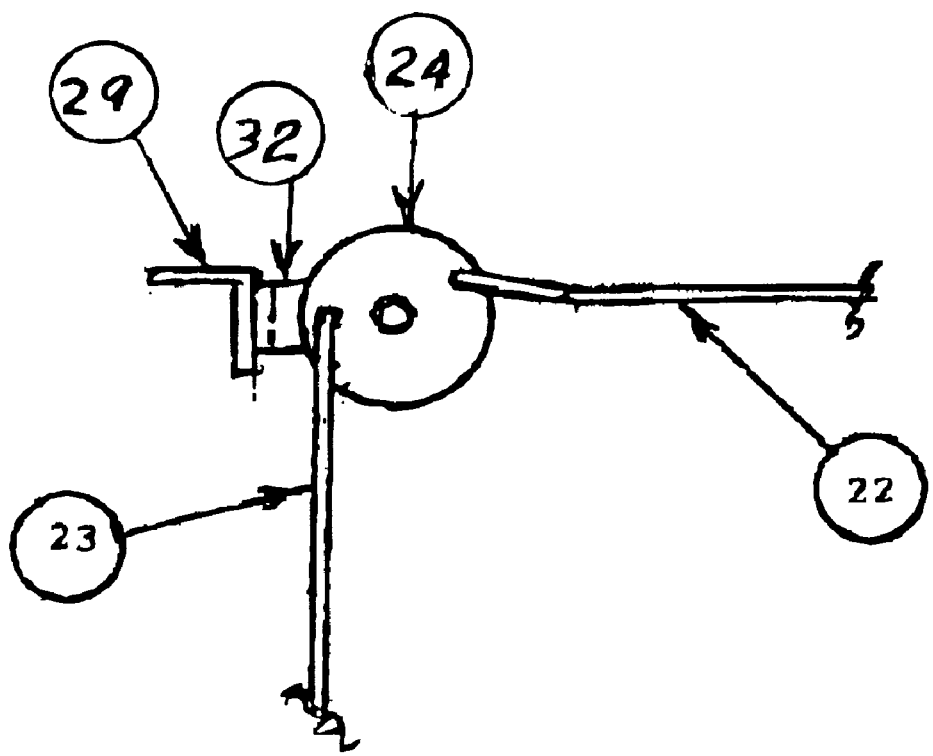
FIG. 12 shows a side view of the linkage installation of the bell crank assembly.

The set and lock rod 22 is provided to lock the door 20 open when inserted in the lower hole in the door when the trap has been set to capture an animal or fowl. Upon activation of the trap (through linkage to be described below) the set and lock rod 22 is withdrawn from the lower hole 41A in the door 20 which causes the door 20 to close rapidly through the force of gravity acting on the door. Once the door 20 has closed the set and lock rod 22 engages the upper hole 41B in the door 20, thus locking the door 20 closed and preventing the captured animal or fowl from escaping the trap. The set and lock rod 22 is preferably made from 3/16 inch plated steel rod. The linkage of the trap mechanism as shown in FIG. 3A will now be described. The trap mechanism is provided with a trip pad 25, preferably being formed of one inch square 14 gauge plated steel cage wire, being hingedly connected through crimped overhanging wire portions (FIG. 3C) along a bottom portion of an interior side of the back end 18 (as shown in FIG. 1). The trip pad 25 is held in a raised position along a forward edge by a trip link 23 when the trap has been set to capture an animal or fowl therein. The trip link 23 is preferably made from 3/16 inch plate steel rod. The trip link 23 is secured to the forward edge portion of the trip pad 25 by crimping the end of the trip link 23 around a forward wire edge of the trip pad 25 as shown in FIGS. 1 and 3A. The trip link 23 extends vertically ending in a right angled bent portion 23B (as shown in FIG. 3D). Near the end of the bent portion of the trip link 23, an aperture 23A is provided therethrough for receiving a cotter pin 46 (shown in FIG. 3A) for securing the bent portion of the trip link to a bell crank wheel 24 through a trip link aperture 24A in the bell crank wheel 24 (as shown in FIG. 12). The details concerning the mounting of the bell crank wheel 24 to interior portion of the trap enclosure 17 are described below. The circular shaped bell crank wheel 24 translates (through rotational movement) the downwardly directed force of the trip link 23, when actuated by an animal or fowl springing the trap, to a horizontally directed force applied to the set and lock rod 22 causing the set and lock rod 22 to be withdrawn from the lower hole of the door allowing the door to close as described above. The set and lock rod 22 is provided with a right angled bent portion 22B at an end (as shown in FIG. 3B). Near the end of the bent portion 22B of the set and lock rod 22, an aperture 22A is provided therethrough for receiving a cotter pin 46 (shown in FIG. 3A) for securing the bent portion 22B of the set and lock rod 22 to the bell crank wheel 24 through a set and lock rod aperture 24B in the bell crank wheel 24 (as shown in FIGS. 3A and 12). The bell crank wheel 24 is preferably made from a 3/16 inch thick polycarbonate sheet cut into a circular shape and having a centrally located aperture for mounting the bell crank wheel 24 as shown in FIGS. 1, 3A, 3E, 11 and 12.

The bell crank wheel 24 is mounted to the top of the interior portion of the center section enclosure 17 through a support bracket 29. The support bracket 29 is attached to the interior top portion of the enclosure using hex bolts, nuts and washers at opposing side edges of the interior top of the trap as shown in FIG. 1. The support bracket 29 is preferably an aluminum right angle member having dimension of ¾ inch for each angled side portion thereof. FIG. 11 provides more detail of the attachment of the bell crank wheel 24 to the support bracket 29. A right angled mounting bracket 32 is joined to support bracket 29 through hex bolts 34, hex nuts 35 and washers such that a portion of the right angled mounting bracket 32 extends adjacent the support bracket 29. The bell crank wheel 24 is attached to the right angled mounting bracket 32 in a spaced configuration through use of a shoulder bolt 33, spacer 31, hex fiber locknut 30 and bell crank mounting aperture 24C (FIG. 3E) in such a manner that the bell crank wheel 24 is secured to the right angled mounting bracket 32 allowing the bell crank wheel 24 to rotate due to applied force from the trip link as shown in FIGS. 11 and 12. The shoulder bolt 33 is preferably 1½ inch long and having a ¼×20 thread. The hex bolt 34 is preferably ½ inch long and having a ¼×20 thread. The hex nuts 35 and the hex fiber locknut preferably have a ¼×20 thread. The spacer is preferably ⅜ inch in length and having a ¼ inch inside diameter. Mounting bracket 32 is preferably made from right angle corner type plated steel having dimensions of 2 inch×2 inch×½ inch. Support bracket 29 and forward support bracket 39 are attached to the inside of the enclosure 17 with bolts, nuts and fender washers 42 as shown in FIG. 1.

Turning now to the action control assembly as shown in FIG. 8, the forwardly disposed end of the set and lock rod 22 is stationed in position to engage the door 20 through an aperture 39A in the forward support bracket 39. The forward support bracket 39 is fastened to the top interior of the center section enclosure 17 in a similar manner as disclosed above for securing the support bracket 29 to the enclosure 17. However, forward support bracket 39 is attached at a forward portion of the trap to provide the set lock rod 22 engagement with the door 20. The sensitivity of the trap is adjustable through adjusting the compression tension of a spring 38. The spring 38 is assembled around and over the set and lock rod 22 and engages a flat washer 37 at one end against the forward support member 39 and at another end engages another washer 37. The set and lock rod 22 is provided with a plurality of adjustment holes 43 therethrough which receive a cotter pin (not shown in FIG. 8) and which allows variable compression of the spring 38 thereby permitting selective sensitivity adjustment to the triggering mechanism of the trap. The spring 38 is provided with a spring guard 36 which covers and protects the spring 38 for all weather use by preventing dirt and debris from engaging the spring.

The trap is provided with a carrying handle 21 which is preferably made from 3/16 inch diameter aluminum wire. The carrying handle 21 is provided with a grip made from rubber hose, gasoline fuel line or equivalent tubular shaped material.

In a preferred embodiment the trap has dimensions being 12 inches wide, 12 inches high and 20 inches in length. The trap is formed by folding a wrap around center section which is 20 inches wide and 49 inches long in flat plan pattern. This provides a one inch overhang for forming crimp wires to use for attaching the side to the bottom. The center section having three 90 degree bends spaced 12 inches apart to form the enclosure 17 as shown in FIG. 1. The front end 19 and the back end 18 a preferably 14 inches square including a one inch overhang for providing crimp wires on all sides for attaching to the center section 17 after the enclosure is formed and attached together. The front end has an opening 45 cut therein and door guides 27 are attached prior to attaching the front end 19 to the center section 17. The working mechanism shown in FIG. 3A and the attaching support brackets 29 and 39 are installed prior to installing the front end 19. The back end 18 having the bait guard 26 and the trip pad 25 attached thereto are then installed by attachment to the center section 17. The bell crank wheel assembly shown generally in FIG. 12 is assembled and attached to the support bracket 29 prior to attachment to the interior top end of the center section 17 and prior to attachment of the front end 19. The set and lock rod 22 and trip link are installed through the door opening 45 in the front end 19. The support brackets 29 and 39 attach to the interior top side of the center section 17 through bolts nuts and washers as recited above. The action control assembly 40 is installed through the door opening 45. The bell crank wheel 24 partially protrudes exterior of the trap through an opening in the top of the center section enclosure 17 approximately ½ inch allowing manual operation of the trap to permit opening the door to release a captured animal or to permit the trap to be set. The opening is preferably cut out of the wire cage of the top of the center section 17 as required to permit ease of actuation.

While only a preferred embodiment of the invention has been described herein in detail, the invention is not limited thereby and modifications can be made within the scope of the attached claims.

I claim:
1. A live animal and fowl trap having
a top, a bottom and opposing sidewalls forming a center enclosure section, and a front end and a back end,
the top, bottom, opposing sidewalls, front end and back end being formed of cage wire,
overhanging wire portions extending from peripheral edges of the center enclosure section, front end and back end to provide means for joining the front end and back end to the center enclosure section, and for joining edges of the center enclosure section to form the trap;
the front end having a door front opening cut into a center portion allowing ingress of live animals and fowl, a pair of vertically oriented door guides attached to the front end along opposing sides of the front end, a pair of door stops attached to the bottom of the trap adjacent a bottom portion of the vertically oriented door guides, and a door having an upper hole located adjacent an upper end of the door and a lower hole located adjacent a lower end of the door, the door adapted to slide up and down within the door guides and the door being supported in a closed position by the door stops;
the back end having a bait guard formed of cage wire attached to a center lower portion of the back end, the bait guard being attached to the back end in a staggered manner thus reducing cage wire aperture size to prevent a bait enclosed within the trap being disturbed by an animal from an exterior of the trap;
a trapping mechanism comprising,
a trip pad formed of cage wire having a forward edge and a rearward edge, the rearward edge of the trip pad being hingedly connected along a rear portion of the bottom of the trap allowing the forward edge of the trip pad to move vertically up and down,
a substantially vertically oriented trip link attached at a lower end to the forward edge of the trip pad and attached at an upper end to a bell crank wheel,
the bell crank wheel being a circular wheel shaped pivoting member having a centrally located mounting aperture, a peripherally located trip link aperture and a peripherally located set and lock rod aperture, the trip link aperture and the set and lock rod aperture being located on opposite peripheral sides of the centrally located mounting aperture of the bell crank wheel, the bell crank wheel being attached to a center interior of the top of the trap through a transverse support bracket extending along the interior top of the trap and adjacent the opposing sidewalls, the bell crank wheel having a portion extending exterior the top of the trap providing manual operation of the trapping mechanism, the bell crank wheel translating a vertically directed force from the trip link to a horizontally directed force on the set and lock rod,
the set and lock rod being substantially horizontally oriented and attached at an end to the bell crank wheel through the set and lock rod aperture of the bell crank wheel, the set and lock rod being supported at a forward end of the trap through an aperture in a forward transverse support bracket extending along the interior top of the trap and adjacent the opposing sidewalls, adjacent the front end of the trap the set and lock rod having an adjustable sensitivity action control assembly;

the adjustable sensitivity action control assembly comprising, a first washer placed over and around the set and lock rod adjacent a forward edge of the forward transverse support bracket, a compression spring being placed over and around the set and lock rod adjacent the first washer, a second washer being placed over and around the set and lock rod adjacent the compression spring, the set and lock rod having a plurality of adjustment holes therethrough adjacent the compression spring and second washer, a pin inserted into one of the plurality of adjustment holes for setting a desired sensitivity, the sensitivity being based on initial compression of the compression spring, a spring guard placed over and around the set and lock rod having the first washer, compression spring, second washer and pin attached thereto, and a door hole engaging portion at the forward end of the set and lock rod;

the door hole engaging portion of the set and lock rod engages the lower hole in the door in a trap set position holding the door up and open, the door hole engaging portion of the set and lock rod engages the upper hole in the door in the trap locked position holding the door down and locked;

wherein in operation, a bait is placed in the trap upon the trip pad adjacent the back end of the trap, the trap is set in the trap set position, an animal enters the trap and applies a downwardly directed force to the trip pad which applies a downwardly directed force on the trip link, the downwardly directed force from the trip link is translated through the bell crank wheel into a rearwardly horizontally directed force on the set and lock rod causing the door engaging portion of the set and lock rod to be withdrawn from the lower hole in the door, the door falls through gravity, the door hole engaging portion engages the upper hole in the door locking the door down and locking the animal within the trap.

2. The live animal and fowl trap according to claim 1, wherein the trap having a centrally located handle attached to a top exterior portion of the trap for manually transporting the trap.

\* \* \* \* \*